United States Patent [19]

Lewin

[11] 4,154,454

[45] May 15, 1979

[54] ANTI-SWAY DEVICE

[76] Inventor: Ralph Lewin, 7520 Elbow Dr., Calgary, Alberta, Canada, T2V 1K1

[21] Appl. No.: 848,378

[22] Filed: Nov. 3, 1977

[51] Int. Cl.² ............................................. B62D 53/00
[52] U.S. Cl. ................................ 280/446 B; 280/474
[58] Field of Search ...................... 280/446 B, 474, 492

[56] References Cited

U.S. PATENT DOCUMENTS

| 3,612,575 | 10/1971 | Stewart | 280/474 |
|---|---|---|---|
| 3,719,373 | 3/1973 | Johnson | 280/474 |
| 3,801,137 | 4/1974 | Zucca | 280/474 |

Primary Examiner—Joseph F. Peters, Jr.
Assistant Examiner—R. Schrecengost
Attorney, Agent, or Firm—Wenderoth, Lind & Ponack

[57] ABSTRACT

An anti-sway device for a towing vehicle and a trailer is disclosed, comprising a channel rigidly mounted on the underside of a trailer hitch attached to the towing vehicle and a rigid elongated member mounted on the trailer and engageable within the channel, whereby, when the member is so engaged, lateral movement of the trailer with respect to the vehicle is prevented.

9 Claims, 6 Drawing Figures

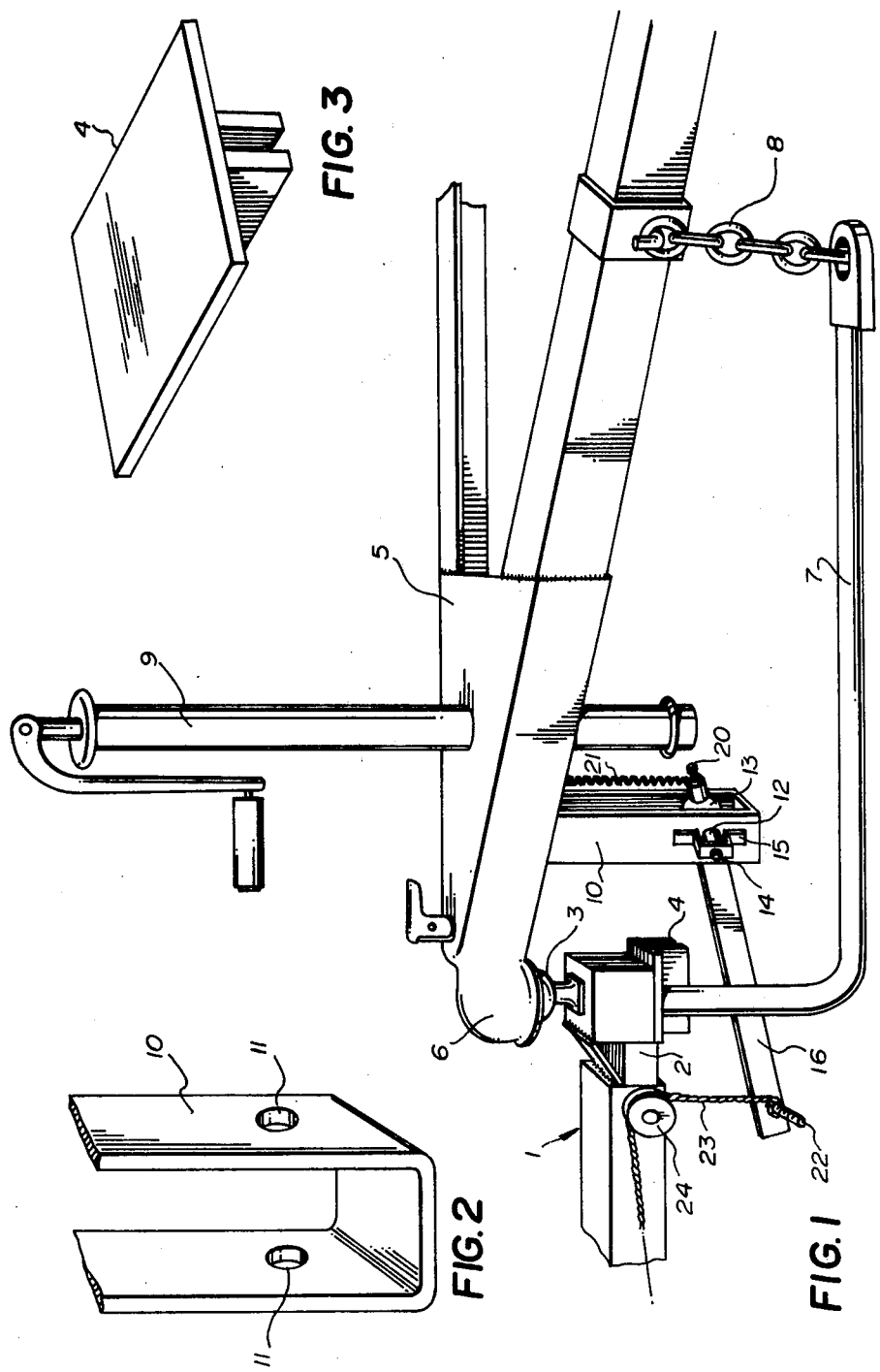

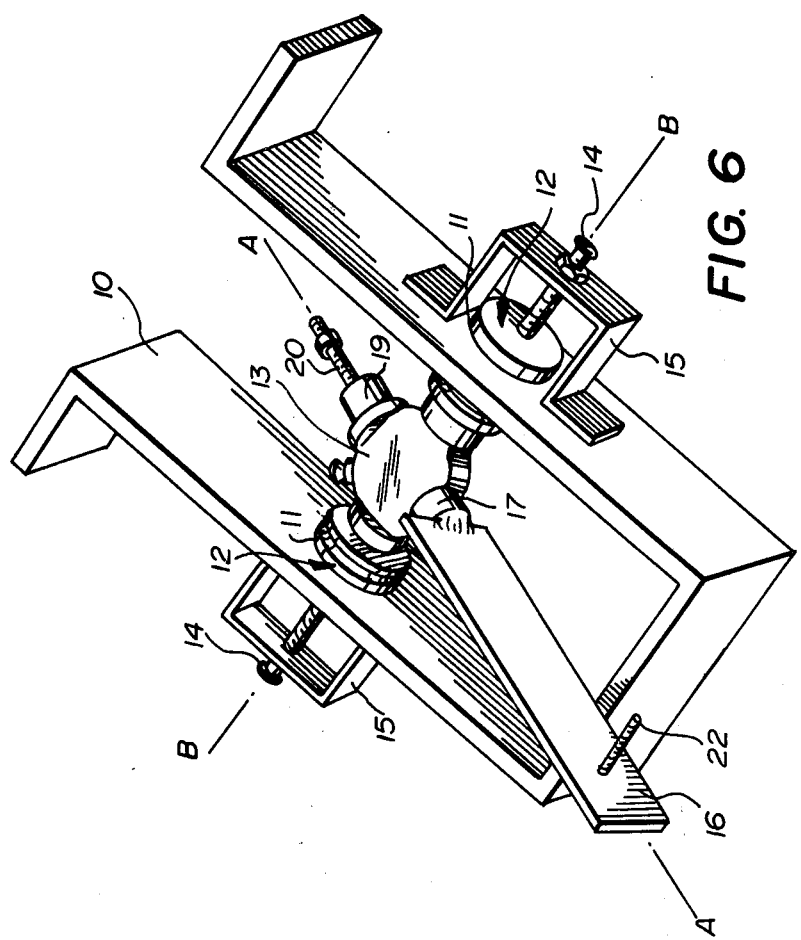
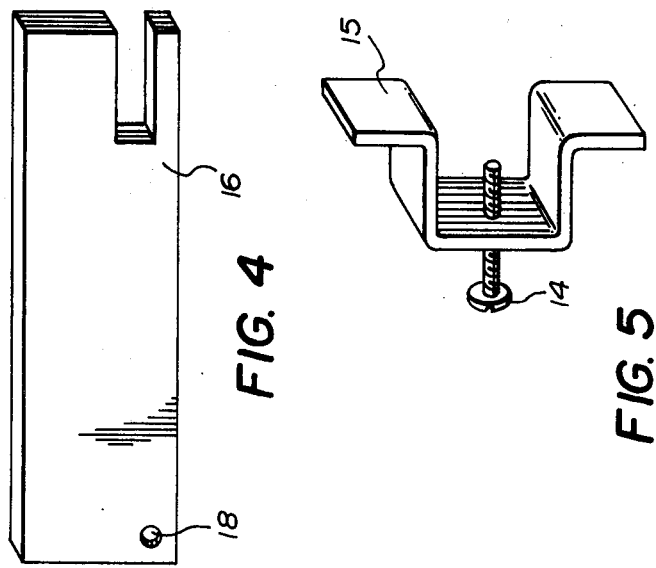

ANTI-SWAY DEVICE

BACKGROUND OF THE INVENTION

1. Field of the Invention

This invention relates to devices for eliminating relative lateral movement between a towing vehicle and a trailer towed thereby.

2. Description of the Prior Art

Various devices are known to minimize swaying of a towed vehicle. However, the inventor is unaware of any device that eliminates swaying altogether. An example of a device that limits relative lateral movement between the towing vehicle and a trailer is the device disclosed in Canadian Pat. No. 522,290, wherein relative motion of the trailer and the cab is limited by the engagement of stops 24 with dogs 35. However, it will be noted that this arrangement does not prevent relative lateral movement, but merely limits it.

SUMMARY OF THE INVENTION

This invention provides a device for eliminating relative lateral movement in a horizontal plane (i.e., "sway") between a trailer and its towing vehicle. More particularly, it eliminates rotation of the towed vehicle about a vertical axis through the point of its attachment to the towing vehicle. In this specification, the word "sway" will be used to denote such relative lateral movement or rotation. This invention is particularly adapted to be used on recreational trailers being towed by automobiles or other personal use vehicles, but it is not limited to such application.

This invention is adapted to eliminate sway, but to permit rotation of the towed vehicle about axes passing through the said point of attachment and disposed in a horizontal plane, parallel to and perpendicular to the longitudinal axis of the towing vehicle. The latter rotations are desirable in order to allow the trailer to adapt to irregularities in the road or other terrain across which it is being towed.

This invention comprises an anti-sway device for a towing vehicle and trailer comprising a channel rigidly mounted on the towing vehicle and a rigid elongated member mounted on the trailer and engageable within the channel, whereby, when the member is so engaged, sway of the trailer is prevented. More particularly, this invention, in its preferred embodiment, comprises an anti-sway device for a towing vehicle having a towing ball assembly and a trailer towed thereby having a forwardly extending hitching frame, said device comprising an elongated channel having a rectangular cross section rigidly mounted on the underside of the towing ball assembly, the longitudinal axis of the channel being disposed substantially parallel to the longitudinal axis of the towing vehicle and the channel opening downwardly, an elongated substantially rectangular rigid bar adapted to be received within the channel and mounted on a joint permitting relative rotation about two horizontal axes, the joint being mounted within a bracket rigidly attached to the underside of the hitching frame, the bar being disposed with its longitudinal axis in a vertical plane substantially parallel to a vertical plane extending through the longitudinal axis of the trailer, the bar being rotatable with respect to said trailer about axes extending through the point of attachment of said bar to said trailer and disposed in a horizontal plane parallel to and perpendicular to the longitudinal axis of said trailer, but not rotatable about a vertical axis extending through that point, the bar being biased away from engagement with the channel by means of a spring under tension attached to the underside of the hitching frame and to a spider projecting from the universal joint on the side thereof opposite said bar, the end of the bar adjacent the channel being attached to a cable which extends over a pulley and thence to a lever within the vehicle, the lever being actuatable by the operator of the vehicle to bring the bar into engagement with the channel so as to prevent sway of the trailer with reference to the vehicle, the lever being provided with latch means adapted to releasably hold the bar in engagement with the channel, and means to indicate to the vehicle operator whether or not the bar is in engagement with the channel.

It will be appreciated that tolerances that must be built into a mechanical system of this kind will prevent sway from being literally "eliminated" or "prevented"; when these terms are used in this specification to describe the effect of this invention, they of course must be taken to mean "substantially eliminated" or "substantially prevented", to the degree permitted by the tolerances inherent in a particular device embodying this invention.

DESCRIPTION OF THE PREFERRED EMBODIMENT

In the drawings which illustrate the preferred embodiment of this invention,

FIG. 1 is an elevation of a vehicle-mounted trailer hitch, a trailer hitching frame and the anti-sway device of this invention;

FIG. 2 is an elevation of a bracket adapted to be mounted on the hitching frame to support the anti-sway bar;

FIG. 3 is an elevation of a channel adapted to be mounted on the underside of the trailer hitch;

FIG. 4 is an elevation of the anti-sway bar;

FIG. 5 is an elevation of a lateral bracket for mounting a suitable joint;

FIG. 6 is an elevation of the anti-sway bar and joint assembly. In the drawings, a towing vehicle (not shown), which may be an automobile or truck, is provided with a trailer hitch generally designated by 1, comprising a hitching member 2 upon which is mounted a hitching ball 3, the hitching member extending rearwardly from the rear end of the towing vehicle. On the underside of the hitching member 1 is provided a channel 4 which is welded thereto, the channel 4 consisting of three rectangular pieces of iron or steel welded together, as is best shown in FIG. 3.

A trailer to be towed by the towing vehicle is provided with a forwardly extending hitching frame 5 which has, at its forward end, a spherical socket 6 adapted to engage with the hitching ball 3. The trailer hitch is provided with a conventional equalizer bar 7 which may be attached by means of a chain 8 to the trailer hitching frame 5. The hitching frame 5 is also provided with a jack 9 by means of which the hitching frame 5 may be lifted off ball 3.

A generally U-shaped bracket 10 is welded to the underside of the hitching frame 5. Bracket 10 is provided with circular apertures 11 on either side within which are mounted bearing members 12 for bearing a joint 13. The bearing members are secured to bracket 10 by means of bolts 14 extending through lateral brackets 15 welded to the main bracket 10. The position of joint 13 may be adjusted by means of bolts 14. A rectangular iron or steel member or bar 16 is welded to a member 17 of joint 13, and extends forwardly from bracket 10. Member 16 is provided with an aperture 18 at its forward end; see FIG. 4.

A rearwardly extending member 19 of the joint 13 is attached by means of a bolt 20 or other suitable device to a coil spring 21 which is attached at its opposite end to a hitching frame 5. Coil spring 21 is under tension and tends to maintain member 16 with its forward end in its lowermost position, away from channel 4.

Joint 13 permits member 16 to rotate about horizontal axis A—A and B—B extending through member 16 (see FIG. 6), axis A—A being the longitudinal axis of member 16 and axis B—B being an axis perpendicular to axis A—A and passing through the centre of joint 13. Member 16 cannot rotate about a vertical axis extending through the centre of the joint 13.

A pin 22 is provided and is adapted to be inserted through aperture 18 in member 16 and to be attached thereto by a nut or other suitable means (not shown). Pin 22 is attached to a cable 23 which extends over a pulley 24 and thence to the interior of the vehicle.

In the interior of the vehicle the cable is attached by means of suitable mechanical arrangements to a lever, which may be similar to an emergency brake lever, by which the cable may be actuated in order to draw member 16 upwardly and into engagement within the channel 4. Said lever is preferably provided with latching means to hold it in a position whereby member 16 is maintained in engagement within channel 4. The leaver is also preferably provided with means whereby it may be quickly and easily released by the vehicle operator.

When member 16 is engaged within channel 4, rotation of the trailer about a vertical axis passing through the center of ball 3 is prevented, thereby eliminating sway. The trailer may still rotate about horizontal axes passing through the center of joint 13 and/or ball 3 parallel to and perpendicular to the longitudinal axis of the trailer, so that the trailer may take up positions that accomodate it to irregularities in the road or other terrain over which it is passing.

The anti-sway device of this invention is particularly intended to be actuated under certain driving conditions. It is intended to be actuated in highway driving at 40 miles per hour and over, particularly where no sharp curves are involved. It should not be engaged at low speeds, in conditions where sharp turns are required, or on city streets. When engaged under proper conditions, steering becomes easier, the trailer contributes to steadying the car on the road and driving safety and comfort is greatly improved. Indeed, in many situations gas mileage may be improved. Braking safety is also improved by the elimination of any tendency of the trailer to "jacknife".

The principle of this invention is not limited to the particular mechanical devices disclosed, which may obviously, in many respects, be replaced, by equivalent devices. For example, tension spring 21 may be replaced by a hydraulic cylinder or by another type of spring, possibly located elsewhere. It is not essential to utilize a blade and channel combination; instead, an arrangement comprising a recess on the towing vehicle and a rectractable tongue on the trailer hitching frame might be employed. The anti-sway device might be actuated hydraulically or electrically instead of mechanically. Different ways of arranging the various components of the invention might be divised. This invention is intended to include mechanical equivalents or workshop variations that embody its basic principles, and is not restricted to the preferred embodiment shown in the Figures.

What I claim as my invention is:

1. An anti-sway device for a towing vehicle and trailer comprising a channel rigidly mounted on the vehicle substantially parallel to the longitudinal axis of the vehicle and a rigid elongated member mounted on the trailer substantially parallel to the longitudinal axis of the trailer so as to be rotatable with respect to the trailer about the member's two horizontal axes, but not its vertical axis, and engageable within the channel, whereby, when the member is so engaged, lateral movement of the trailer with respect to the vehicle is prevented.

2. The invention defined in claim 1 wherein the rigid elongated member is slidably engageable within the channel.

3. The invention defined in claim 2 wherein the elongated member includes a joint permitting rotation of the member about its two horizontal axes, said joint being mounted within a bracket rigidly attached to the underside of a hitching frame mounted on the trailer.

4. The invention defined in claim 3 wherein the member comprises a rectangular bar.

5. The invention defined in claim 4 wherein the channel is rectangular in cross-section.

6. The invention defined in claim 5 wherein the member is biased away from the channel and means is provided for bringing the member into engagement with the channel.

7. The invention defined in claim 6 wherein said means is selectively operable from within the vehicle.

8. The invention defined in claim 7 wherein said means comprises a cable attached to said member and actuatable by a lever within said vehicle so as to lift said member into position within said channel.

9. On a towing vehicle having a towing ball assembly mounted on the rear thereof and a trailer towed thereby having a forwardly extending hitching frame, an anti-sway device comprising:
   an elongated channel having a rectangular cross section rigidly mounted on the underside of the twoing ball assembly, the longitudinal axis of the channel being disposed substantially parallel to the longitudinal axis of the towing vehicle, and the channel opening downwardly;
   an elongated substantially rectangular metal bar adapted to be received within said channel and mounted on a joint permitting relative rotation about two horizontal axes, the joint being mounted within a bracket rigidly attached to the underside of said hitching frame, said bar being disposed with its longitudinal axis in a vertical plane substantially parallel to a vertical plane extending through the longitudinal axis of said trailer, said bar being rotatable with respect to said trailer about an axis extending longitudinally through the centre of said bar and about an axis extending horizontally through the centre of rotation of said joint, but not about a vertical axis extending through the centre of said joint;
   said bar being biased away from engagement with said channel by means of a spring under tension attached to the underside of said hitching frame and to a member projecting from said joint on the side thereof opposite from said bar;

the end of said bar adjacent said channel being attached to a cable;

said cable extending over a pulley and thence to a lever within said vehicle, said lever being actuatable to bring said bar into engagement within said channel so as to prevent lateral movement of the trailer with reference to the vehicle;

said lever being provided with latch means adapted to releasably hold said bar in engagement with said channel; and means to indicate to the vehicle operator whether or not the bar is in engagement with the channel.

* * * * *